US008754841B2

(12) United States Patent
Takada et al.

(10) Patent No.: US 8,754,841 B2
(45) Date of Patent: Jun. 17, 2014

(54) DISPLAY DRIVER

(71) Applicants: Naoki Takada, Yokohama (JP); Yasuyuki Kudo, Fujisawa (JP); Yoshiki Kurokawa, Tokyo (JP); Goro Sakamaki, Fuchu (JP)

(72) Inventors: Naoki Takada, Yokohama (JP); Yasuyuki Kudo, Fujisawa (JP); Yoshiki Kurokawa, Tokyo (JP); Goro Sakamaki, Fuchu (JP)

(73) Assignee: Renesas Electronics Corporation, Kanagawa (JP)

( * ) Notice: Subject to any disclaimer, the term of this patent is extended or adjusted under 35 U.S.C. 154(b) by 0 days.

(21) Appl. No.: 13/734,144

(22) Filed: Jan. 4, 2013

(65) Prior Publication Data

US 2013/0120480 A1 May 16, 2013

Related U.S. Application Data

(63) Continuation of application No. 11/943,199, filed on Nov. 20, 2007.

(30) Foreign Application Priority Data

Nov. 21, 2006 (JP) ................................ 2006-313832

(51) Int. Cl.
*G09G 3/34* (2006.01)
*G02F 1/13357* (2006.01)

(52) U.S. Cl.
CPC ............ *G09G 3/3413* (2013.01); *G09G 3/3406* (2013.01)
USPC .......................................... 345/102; 345/690

(58) Field of Classification Search
CPC ........................... G09G 3/3413; G09G 3/3406
USPC ........... 345/55, 102, 205, 207, 691, 156, 159, 345/163, 173, 690; 315/291; 455/566; 356/73.1; 715/702
See application file for complete search history.

(56) References Cited

U.S. PATENT DOCUMENTS

| | | | | |
|---|---|---|---|---|
| 7,277,079 | B2 | 10/2007 | Kobayashi et al. | |
| 7,339,565 | B2 | 3/2008 | Kim | |
| 7,474,289 | B2 | 1/2009 | Sakashita | |
| 7,567,291 | B2 | 7/2009 | Bechtel et al. | |
| 7,692,612 | B2 | 4/2010 | Sankar et al. | |
| 7,786,963 | B2 | 8/2010 | Hong et al. | |
| 7,796,143 | B2 | 9/2010 | Huang | |
| 7,825,942 | B2 * | 11/2010 | De Greef | 345/690 |

(Continued)

FOREIGN PATENT DOCUMENTS

| | | |
|---|---|---|
| JP | 3-226716 | 10/1991 |
| JP | 11-65531 | 3/1999 |

(Continued)

*Primary Examiner* — Quan-Zhen Wang
*Assistant Examiner* — Michael J Eurice
(74) *Attorney, Agent, or Firm* — Mattingly & Malur, PC

(57) ABSTRACT

In a display driver, a first backlight control unit using a histogram and a second backlight control unit using an optical sensor can be used in combination. The display driver includes a PWM generating unit setting a control signal value consisting of a product of a luminance rate of X % and a luminance rate of Y % as a luminance rate of a control signal for controlling a backlight with respect to maximum backlight luminance when a luminance rate of a control signal obtained by first backlight control with respect to the maximum backlight luminance is X % and a luminance rate of a control signal obtained by second backlight control with respect to the maximum backlight luminance is Y %.

14 Claims, 7 Drawing Sheets

(56) References Cited

U.S. PATENT DOCUMENTS

| | | | | |
|---|---|---|---|---|
| 7,843,422 | B1 | 11/2010 | Ludden et al. | |
| 2001/0040538 | A1* | 11/2001 | Quanrud | 345/55 |
| 2003/0098861 | A1* | 5/2003 | Nakatsuka et al. | 345/212 |
| 2005/0057554 | A1* | 3/2005 | Yamamoto et al. | 345/211 |
| 2005/0146496 | A1 | 7/2005 | Nguyen et al. | |
| 2005/0190142 | A1 | 9/2005 | Ferguson | |
| 2005/0231457 | A1 | 10/2005 | Yamamoto et al. | |
| 2006/0119612 | A1* | 6/2006 | Kerofsky et al. | 345/590 |
| 2007/0097069 | A1 | 5/2007 | Kurokawa et al. | |
| 2008/0136844 | A1* | 6/2008 | Takada et al. | 345/690 |

FOREIGN PATENT DOCUMENTS

| | | |
|---|---|---|
| JP | 2002-158894 | 5/2002 |
| JP | 3368819 | 1/2003 |
| JP | 2005-338511 | 12/2005 |
| JP | 2005-321423 | 11/2006 |
| KR | 10-1998-070572 | 10/1998 |
| KR | 10-2006-0035025 | 4/2006 |
| TW | 200501045 | 1/2005 |
| TW | 200538804 | 12/2005 |
| TW | 200634695 | 10/2006 |

* cited by examiner

| DECOMPRESSED DISPLAY DATA (214) | SELECTION DATA VALUE (212) | BACKLIGHT CONTROL SIGNAL (ILLUMINANCE RATE) (215) | |
|---|---|---|---|
| 100% | 255 | 255 | (100%) |
| 104% | 245 | 234 | (96%) |
| 108% | 235 | 213 | (92%) |
| : | : | : | |
| 120% | 204 | 156 | (80%) |
| 124% | 194 | 140 | (76%) |
| 130% | 179 | 117 | (70%) |

| FILTERING ILLUMINANCE DATA (310) | BACKLIGHT CONTROL SIGNAL (LUMINANCE RATE) (308) | |
|---|---|---|
| 5001Lux~ | 60 | (24%) |
| ~5000Lux | 255 | (100%) |
| ~1000Lux | 204 | (80%) |
| ~100Lux | 128 | (50%) |
| ~20Lux | 64 | (25%) |
| ~5Lux | 0 | (0%) |

SWITCHING SIGNAL (1) = 1, SWITCHING SIGNAL (2) = 1

SWITCHING SIGNAL (1) = 0, SWITCHING SIGNAL (2) = 1

SWITCHING SIGNAL (1) = 1, SWITCHING SIGNAL (2) = 0

SWITCHING SIGNAL (1) = 1,
SWITCHING SIGNAL (2) = 1,
THRESHOLD SETTING VALUE = 76d (30%)

SWITCHING SIGNAL (1) = 0,
SWITCHING SIGNAL (2) = 1,
THRESHOLD SETTING VALUE = 76d (30%)

SWITCHING SIGNAL (1) = 1,
SWITCHING SIGNAL (2) = 0,
THRESHOLD SETTING VALUE = 76d (30%)

DISPLAY DRIVER

CROSS-REFERENCE TO RELATED APPLICATION

The present application is a continuation of U.S. patent application Ser. No. 11/943,199, filed Nov. 20, 2007, which claims priority from Japanese Patent Application No. JP 2006-313832, filed Nov. 21, 2006, the content of which is hereby incorporated by reference into this application.

TECHNICAL FIELD OF THE INVENTION

The present invention relates to a technology for a display driver and, in particular, to a technology effective when applied to backlight control of a liquid crystal display device.

BACKGROUND OF THE INVENTION

In mobile devices in recent years, such as cellular phones, a transparent or a translucent liquid-crystal display is mainly adopted, and power for a backlight of the liquid-crystal display part accounts for the majority of power of the entire module. And therefore, innovation for reducing the power for a backlight is required.

As one innovation for reducing the power for a backlight, a method described in Japanese Patent Application Laid-Open Publication No. 11-65531 exists. In the Japanese Patent Application Laid-Open Publication No. 11-65531, a method in which by decompressing image data by an amount of reducing backlight luminance, change of an image is reduced, and therefore, power consumption is reduced is described.

For example, in a histogram of pixel values of an image in which a pixel having luminance of 80% has maximum luminance, by reducing backlight emission to 80%, which is four-fifth of original backlight emission, and multiplying all pixel values of the image to be displayed by a factor of five-fourth accordingly, the same image can be displayed with an amount of light emission of 80%. Furthermore, by using the histogram, attention is focused to pixels in the top several percent. If this portion has luminance of 60%, by suppressing an amount of light emission of the backlight to three-fifth, that is, 60%, and multiplying all pixel values by a factor of five-third accordingly, a similar image can be obtained. In this case, compared with a method using maximum luminance of an image, display with a smaller amount of light emission can be achieved.

As another innovation for reducing the power for a backlight, a method described in Japanese Patent Application Laid-Open Publication No. 3-226716 exists. In the Japanese Patent Application Laid-Open Publication No. 3-226716, a method of controlling a backlight according to external environment is described. For example, external brightness is sensed by an optical sensor and when light-receiving data thereof is lower than a threshold, a backlight is turned off, thereby reducing superfluous power. Furthermore, according to an external-light condition, for example, since reflection of a liquid-crystal panel surface causes poor viewability of a display in outdoor environment with high illuminance, backlight luminance is increased, on the other hand, the backlight luminance is decreased in indoor environment with low illuminance. In this manner, a backlight can be used efficiently by controlling the backlight with a plurality of luminance levels.

SUMMARY OF THE INVENTION

Meanwhile, it is impossible to realize combinational use of two control, that is, backlight control in which a decompression processing of display data is performed and backlight luminance is reduced according to a decompression rate of the display data as described in the Japanese Patent Application Laid-Open Publication No. 11-65531, and backlight control reducing backlight luminance according to external conditions as described in the Japanese Patent Application Laid-Open Publication No. 3-226716, with a conventional circuit configuration.

Moreover, the method using maximum value described in the Japanese Patent Application Laid-Open Publication No. 11-65531 can be realized with a small amount of increase in circuit size, but it cannot be expected to reduce an amount of light emission significantly. On the other hand, in the method of using a histogram, a power reduction rate can be increased, but logic circuit size for the histogram is large and appropriate hardware is required.

And therefore, an object of the present invention is to provide a display driver realizing backlight control with small circuit size for the histogram method in which a high power reduction rate can be expected and realizing execution of the backlight control and other backlight control in combination.

The above and other objects and novel characteristics of the present invention will be apparent from the description of this specification and the accompanying drawings.

The typical ones of the inventions disclosed in this application will be briefly described as follows.

In the present invention, a histogram is provided not for all pixel values (0 to 255), but for a predetermined position in the histogram, that is, for values of an upper part (for example, 183 to 255). And, if pixels of top several percent in the histogram are within a range of presence of the histogram, operation is performed in a manner similar to a case in which the histogram is provided for all pixel values. If the pixels of top several percent exist outside of the range of presence of the histogram, a minimum value of the range of presence of the histogram is used in place of the pixels of top several percent and the operation is performed.

And, in a case where the backlight control using the histogram is performed in combination with other backlight control (with an optical sensor and the like), a backlight control signal value after the histogram processing is set as 100% for processing. That is, when the backlight control signal value after the histogram processing has a luminance rate of X % with respect to maximum luminance of the backlight and another backlight control signal value has a luminance rate of Y % with respect to the maximum luminance of the backlight, a backlight control signal after combination is set to have a luminance rate of X×Y % with respect to the maximum luminance of the backlight.

The effects obtained by typical aspects of the present invention will be briefly described below.

According to the present invention, the histogram can be configured with values in an upper part only, and therefore, logic circuit size can be reduced. Furthermore, backlight control using the histogram processing can be used in combination with effect of other backlight control. As a result, in a histogram method in which a high power reduction rate can be expected, backlight control with small circuit size can be realized and the backlight control and other backlight control can be executed in combination.

BRIEF DESCRIPTIONS OF THE DRAWINGS

DESCRIPTIONS OF THE PREFERRED EMBODIMENTS

Hereinafter, embodiments of the present invention will be described in detail with reference to the accompanying drawings. Note that the same components are denoted by the same reference symbols throughout the drawings for describing the embodiment, and the repetitive description thereof will be omitted.

In the embodiments of the present invention, in backlight control using a histogram, by using values in an upper part, logic circuit size is reduced as much as possible. Also, in order to use the backlight control in combination with backlight control sensing external-light luminance by an optical sensor and adjusting backlight luminance, two kinds of backlight control signals are combined and a PWM signal for controlling a backlight module is generated. Each embodiment is specifically described below.

(First Embodiment)

A configuration according to a first embodiment of the present invention comprises two backlight control units, that is, a first backlight control unit controlling a backlight based on image data of a liquid-crystal driver and a second backlight control unit controlling a backlight based on an external-light condition. And respective backlight control signal outputs are converted to rate values with respect to maximum luminance, that is, luminance rates, and multiplied together to generate a backlight control signal. The backlight is controlled by this generated backlight control signal.

And, the present embodiment has features that the first backlight control unit performs backlight control using a histogram and that increase in circuit size due to the histogram is small.

The first embodiment of the present invention is described using FIGS. 1 to 5C.

Figure 1:
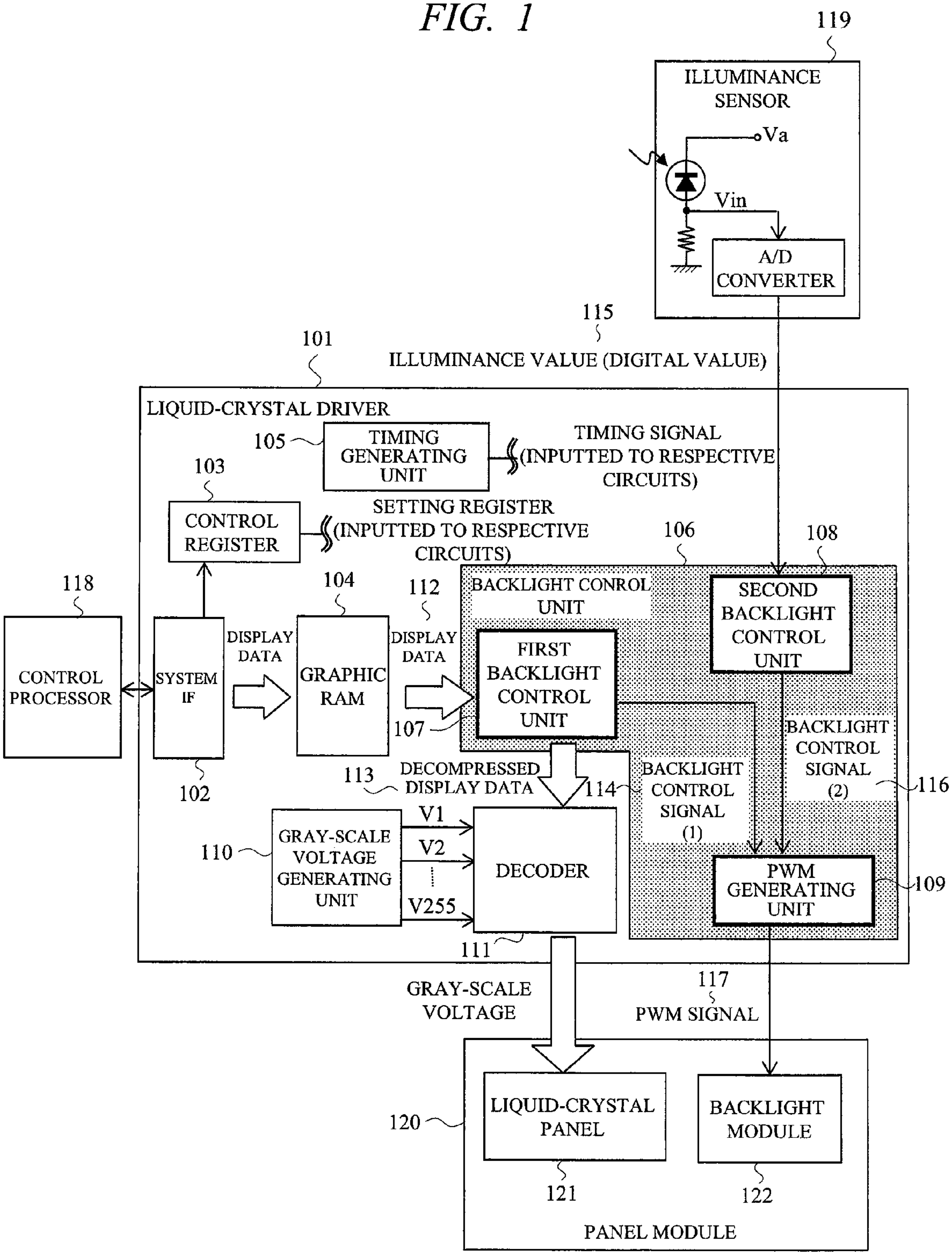
FIG. 1 is a diagram showing a configuration and operation of a liquid-crystal display device including a liquid-crystal driver and peripheral circuits according to a first embodiment of the present invention.

First, with reference to FIG. 1, a configuration and operation of a liquid-crystal display device according to the present embodiment is described. FIG. 1 shows a liquid-crystal display device including a liquid-crystal driver and peripheral circuits.

In FIG. 1, 101 denotes a body of the liquid-crystal driver. 102 to 111 denote internal blocks of the liquid-crystal driver. 112 to 117 denote signals particularly important for describing the present embodiment. A control processor 118, an illuminance sensor 119 and a panel module 120 are disposed in the periphery of the liquid-crystal driver 101.

That is, the liquid-crystal driver 101 according to the present embodiment includes a system interface (IF) 102, a control register 103, a graphic RAM 104, a timing generating unit 105, a backlight control unit 106, a gray-scale voltage generating unit 110, a decoder 111 and the like. The backlight control unit 106 includes a first backlight control unit 107, a second backlight control unit 108 and a PWM generating unit 109.

The system interface 102 of the liquid-crystal driver 101 performs data communication with the control processor 118 disposed outside of the liquid-crystal driver. The system interface 102 receives display data and write data for the control register 103 for controlling each part of the liquid-crystal driver from outside of the driver and outputs these signals to the internal blocks. Here, the control register 103 is a group of registers for controlling each part of the liquid-crystal driver. The graphic RAM 104 stores display data coming from the system interface 102. The timing generating unit 105 generates operation timings for the entire liquid-crystal driver based on contents of the control register 103.

The backlight control unit 106 is a main block in the present invention. The backlight control unit 106 is divided into the first backlight control unit 107, the second backlight control unit 108 and the PWM (Pulse Width Modulation) generating unit 109. A detailed circuit configuration and operation of the backlight control unit 106 are described further below. To the second backlight control unit 108, the illuminance sensor 119 disposed outside of the liquid-crystal driver is connected. The illuminance sensor 119 includes a photodiode and an A/D converter. A current having an amount corresponding to an illuminance value of external environment, such as a fluorescent lamp, flows through the photodiode, and is then converted to a voltage via a resistor. The voltage obtained by conversion generates an illuminance value (digital data) 115 at the A/D converter.

The decoder 111 selects a gray-scale voltage of one level from gray-scale voltages generated by the gray-scale voltage generating unit 110, based on decompressed display data 113 transferred from the backlight control unit 106. The gray-scale voltages are generated as many as the number of horizontal pixels of the liquid-crystal panel, and are outputted to source lines connected to the respective horizontal pixels.

The panel module 120 driven by this liquid-crystal driver 101 is divided into a liquid-crystal panel 121 and a backlight module 122. The liquid-crystal panel 121 receives the gray-scale voltages and applies desired voltages to the respective horizontal pixels. The backlight module 122 generates a desired voltage based on a PWM signal 117 generated at the backlight control unit 106 and controls backlight luminance.

This liquid-crystal driver 101 includes, in addition to the configuration described above, a circuit for generating a liquid-crystal gate signal and a common signal used for driving the liquid-crystal panel 121, but this circuit is not particularly important in describing the present embodiment, and therefore, detailed description is omitted.

Next, operation of the liquid-crystal driver 101 is described with reference to FIG. 1. Note that, here, it is assumed that display data is RGB data of 256-level gray-scale.

The RGB display data of 256-level gray-scale is inputted from outside through the system interface 102, and is stored in the graphic RAM 104. In the timing generating unit 105, a read timing of the graphic RAM 104 is generated, and display data 112 read from the graphic RAM 104 is transferred to the first backlight control unit 107 of the backlight control unit 106. The first backlight control unit 107 performs a decompression processing of the display data, which is described further below, based on histogram information of the display data 112. The decompressed display data 113 is transferred to the decoder 111. In the decoder 111, a gray-scale voltage of one level is selected from gray-scale voltages of 256 levels generated by the gray-scale voltage generating unit 110 based on the decompressed display data 113. And, using timing generated by the timing generating unit 105, the liquid-crystal gate signal and the common signal are generated, and are also outputted to the liquid-crystal panel 121.

On the other hand, concurrently with the decompression processing, the first backlight control unit 107 generates a backlight control signal (1) 114 lowering a backlight luminance rate corresponding to the decompressed display data 113. The second backlight control unit 108 generates a backlight control signal (2) 116 lowering a backlight luminance rate based on the illuminance value (digital value) 115 inputted from the illuminance sensor 119. The two backlight control signals (1) 114 and (2) 116 are transferred to the PWM generating unit 109, and the PWM signal 117 for controlling a backlight luminance by PWM control.

In particular, in the present embodiment, the backlight control signal (1) 114 obtained by a processing of the first backlight control unit 107 is assumed to have a luminance rate of X % ($0 \leq x \leq 100$) with respect to maximum luminance of the backlight. The backlight control signal (2) 116 obtained by a processing of the second backlight control unit 108 is assumed to have a luminance rate of Y % ($0 \leq x \leq 100$) with respect to the maximum luminance of the backlight. And, the PWM generating unit 109 generates the PWM signal 117 setting a backlight control value consisting of a product of the luminance rate of X % and the luminance rate of Y % as a luminance rate of a backlight control signal for controlling a backlight in the backlight module 122 with respect to the maximum luminance of the backlight.

Here, the PWM control is described. The PWM control is one of backlight control methods, and is pulse-width fluctuation control controlling the backlight luminance by changing a rate between “High width” and “Low width” of a PWM signal of one terminal. For example, in a case where one period of PWM is divided into 255 pieces and the “High width” is set to be 255/255, a fixed High signal is outputted as the PWM signal, and the backlight luminance takes maximum luminance. On the other hand, when the “High width” is set to be 0/255, a fixed Low signal is outputted as the PWM signal, and the backlight luminance takes minimum luminance. And, when the “High width” is set to be 100/255, a High-width ratio of the PWM signal is 100/255 of the PWM period, and therefore, the PWM signal has a High signal for a period approximately 40% of the PWM period, and backlight luminance corresponds thereto is obtained. With a method described above, the backlight luminance is controlled. In a case where the display data is composed of six bits, the number of levels of gray-scale represented by the display data is 256. 255 described above is a value obtained by subtracting 1 from 256 which is a total number of levels of gray-scale.

With operation described above, the gray-scale voltages, the PWM signal 117, the liquid-crystal gate signal and the common signal required for the panel module 120 are generated.

The gray-scale voltages are generated as many as the number of horizontal pixels of the liquid-crystal panel 121, and are outputted to source lines connected to the respective horizontal pixels of the liquid-crystal panel 121, thereby applying desired gray-scale voltages to the respective pixels.

The PWM signal 117 is inputted to the backlight module 122. The backlight module 122 generates a backlight voltage corresponding to the PWM signal 117 to light the backlight. The lit backlight illuminates the liquid-crystal panel 121, and therefore, the display can be viewed.

And, in a case where turning-on and turning-off of the backlight are performed by the control processor 118, such information is written to the control register 103 via the system interface 102, and is then transferred to the backlight control unit 106. The PWM generating unit 109 generates a voltage for turning-on and turning-off of the backlight. The backlight module 122 performs processings of turning-on and turning-off by the PWM signal 117. This operation is prioritized over a signal for controlling a voltage of a power-source for the backlight generated by the backlight control unit 106.

Figure 2:
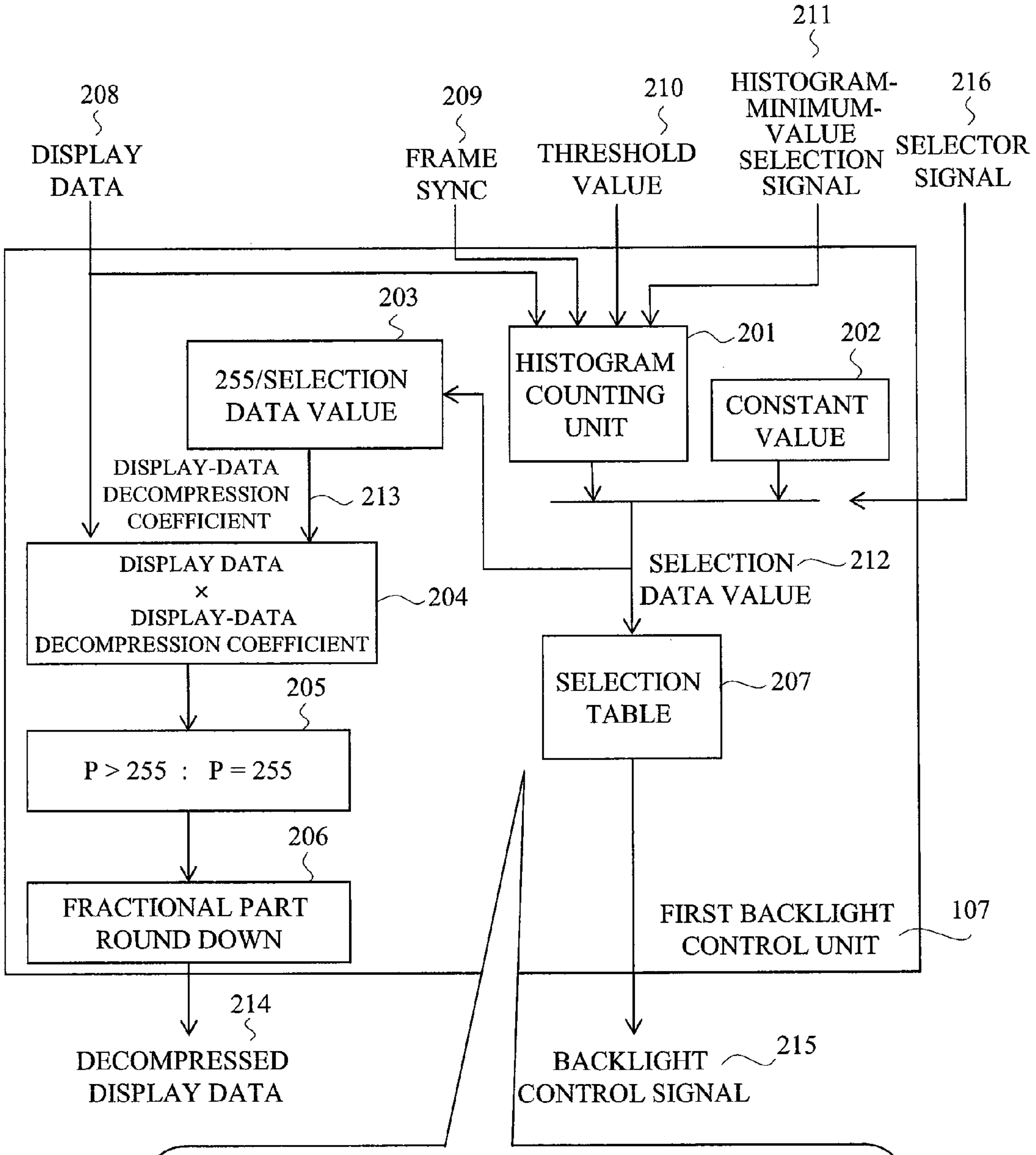
FIG. 2 is a diagram showing a configuration and operation of a first backlight control unit according to the first embodiment of the present invention.

Next, with reference to FIG. 2, a configuration and operation of the first backlight control unit 107 in the backlight control unit 106 is described.

The first backlight control unit 107 includes a histogram counting unit 201, a constant-value storing unit 202, a “255/selection data value” operation value generating circuit 203, a display-data decompression operation circuit 204, an overflow processing circuit 205, a fractional-part rounding down circuit 206, a selection table 207 and the like. In this first backlight control unit 107, an object of detection of the histogram is assumed to be a data range from a brightest level to an N-th level of gray-scale (N is a positive integer and is not 0).

The histogram counting unit 201 counts display data 208 and generates the histogram. From the histogram, a selection data value 212 to be used for the backlight control is calculated, and is transmitted to the “255/selection data value” operation value generating circuit 203 and the selection table 207. This selection data value 212 determines what number data value of the histogram to be used using a threshold value 210 which will be described further below, checks which entry of the histogram the determined data exists in and calculates a value of the entry as a data value. The selection data value 212 is a base for a decompression processing of the display data 208 and a darkening processing of the backlight. A display-data decompression coefficient 213 is calculated from the value, a scaling factor of the data decompression is determined, a backlight control signal 215 is generated and brightness of the backlight is determined.

A frame SYNC 209 is used to cause the histogram counting unit 201 to operate for each frame. The histogram counting unit 201 continues to register the display data 208 sent while the frame SYNC 209 is OFF. On a timing of turning-on of the frame SYNC 209, the histogram counting unit 201 calculates the selection data value 212, clears the histogram and prepares for data counting of the next frame. The threshold value 210 is a parameter to determine what number data value from top of the histogram to be used, as described above, and is used to calculate the selection data value 212. A histogram-minimum-value selection signal 211 is used to determine a range to be used when an upper part of the histogram is used.

Here, the fact that the histogram of the histogram counting unit 201 is not required to have an entire range (0 to 255) of the display data 208 but to have only a part of the range is described. A case in which the histogram has a part of top N % to 100% of luminance (N is an intermediate value of 0 to 100) is considered. There are two cases, that is, a case in which the threshold value 210 to determine what number data value from top of the histogram is in a range of N % to 100% of luminance and a case in which the threshold value is outside of the range, that is, lower than luminance of N %. If the histogram value is inputted in the range of N % to 100% of luminance in a former case, an appropriate value can be selected. However, if the histogram value is outside of the range as in a latter case, the value is taken as a minimum value of the range, that is, N %. And therefore, although there is an adverse effect that the selection data value becomes large when the threshold value has a value outside the range in a case where the histogram has only a part of a range compared with a case in which the histogram has an entire range, the histogram can function.

And, by making N changeable, adjustment such as setting the value higher (for example, 90%) to prevent deterioration in image quality when high image quality is desired or setting the value lower (for example, 70%) to suppress light emission of backlight when power saving is desired even if image quality is deteriorated can be performed. Note that, in this example, percent (%) is used as a unit, such that a part of N % or higher is used with a maximum value of the display data assumed to be 100%. Alternatively, a numeral value of the display data itself can be used. For example, with maximum value of the display data assumed to be 255, a part of the histogram equal to or higher than N (N is an integer larger than 0 and smaller than 255) can be used.

A constant value of the constant-value storing unit 202 is used in a case where a histogram is not used, and makes the selection data value 212 constant irrespectively of a content of the display data. The "255/selection data value" operation value generating circuit 203 performs calculation of a 255/selection data value using the selection data value 212 to calculate the display-data decompression coefficient 213. From the display-data decompression operation circuit 204 to the overflow processing circuit 205 and the fractional-part rounding down circuit 206, a decompression processing of the display data is performed. First, the display-data decompression operation circuit 204 multiplies the inputted display data 208 and the display-data decompression coefficient 213 together. Next, in the overflow processing circuit 205, a saturate calculation changing the multiplication result to 255 when the multiplication result exceeds 255 is performed. Lastly, in the fractional-part rounding circuit 206, a fractional part of the result is dropped and decompressed display data 214 is obtained. The selection table 207 outputs the backlight control signal 215 from the selection data value 212 using the table.

Operation as a whole is described below. The display data 208 is counted for each frame at the histogram counting unit 201, and the result is transmitted to the "255/selection data value" operation value generating circuit 203 and the selection table 207 as the selection data value 212. In the "255/selection data value" operation value generating circuit 203, calculation of 255/selection data value is performed and the display-data decompression coefficient 213 is generated. Using the display-data decompression coefficient 213, from the display-data decompression operation circuit 204 to the fractional-part rounding circuit 206, a decompression processing of the display data is performed and the decompressed display data 214 is outputted. And, from the selection data value 212, the backlight control signal 215 is outputted using the selection table 207. According to these operations, relation shown in a table in lower portion of FIG. 2 is established between the decompressed display data 214 and the backlight control signal 215. Signals are set such that if the decompressed display data 214 changes such as 104%, 108%, with respect to the display data, luminance of the backlight control signal 215 is decreased such as 96%, 92%, that is, the same ratio with the decompressed display data 214. As a result, brightness of the display image viewed on a surface of the liquid-crystal panel is not changed.

Here, a method of calculating a backlight control signal value in the selection table 207 is described. The following relational expression holds between a gray-scale value and relative luminance with respect to a maximum luminance value.

Relative luminance=(gray-scale value/255)^(γ value)(*K* is a real number equal to or larger than zero)

Assuming that the selection data value 212 is 245 and the display-data decompression coefficient is 255/245, the display data is decompressed by 255/245. Now, to keep the relative luminance constant, the backlight luminance is reduced as (245/255)^(γ value) because of the above relational expression. And therefore, if the γ value is determined, the backlight control signal value can be determined. In consideration of human visual angle characteristics, 2.2 is considered as a preferable value of the γ. And therefore, in the selection table 207 shown in FIG. 2, (245/255)^(2.2)=234 is selected. Here, 234 of the backlight control signal 215 means a "High-width rate" in a case where one period of the PWM signal is set to 255.

And, if the constant value of the constant-value storing unit 202 is used, the selection data value 212 is constant irrespectively of a content of the display data. As a result, the display-data decompression coefficient 213 and a backlight voltage selection signal become constant values, and the display data 208 becomes decompressed display data obtained by multiplication by a predetermined scaling factor. And therefore, a change of brightness in an entire image in moving picture display is eliminated, and a blink and flicker of the moving picture is prevented. The method can be used in a case where high image quality is desired to be kept and the like.

Selection which of the value calculated from the histogram and the constant value is used as the selection data value 212 described above, can be performed using a selector signal 216. For example, when changing a selection state of the selector signal by an instruction from the control processor 118 in FIG. 1, the change can be performed by changing register information of the control register 103 via the system interface 102.

Here, by using FIG. 2, relation between the histogram and backlight control is briefly described. For example, in a case where the display data is a dark image, values of dark levels of gray-scale in the histogram are highly accumulated. In this case, in order to increase a decompression rate of the display data, a processing is performed so that the decompressed display data 214 in the selection table 207 is decompressed to 130% with respect to the inputted display data, or close to 130% as possible. If the decompressed display data 214 is decompressed to 130% with respect to the inputted display data, 179 is selected as the selection data value 212 and 117 is selected as the backlight control signal 215, accordingly.

Conversely, in a case where the display data is a bright image, values of bright levels of gray-scale in the histogram are highly accumulated. In this case, in order to decrease the decompression ratio of the display data, a processing is performed so that the decompressed display data 214 in the selection table 207 is decompressed to 100% with respect to the inputted display data, that is, not decompressed, or close to 100% as possible. If the decompressed display data 214 is decompressed to 100% with respect to the inputted display data, that is, not decompressed, 255 is selected as the selection data value 212 and 255 is selected as the backlight control signal 215, accordingly.

Figure 3A:
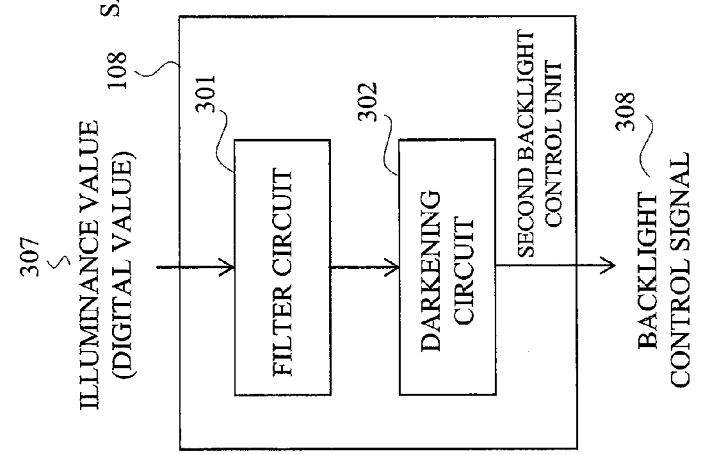
FIG. 3A is a diagram showing a configuration and operation of a second backlight control unit according to the first embodiment of the present invention.
Figure 3B:
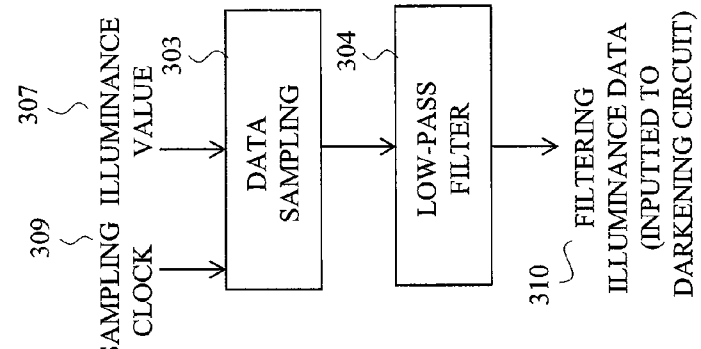
FIG. 3B is a diagram showing a configuration and operation of the second backlight control unit according to the first embodiment of the present invention.
Figure 3C:
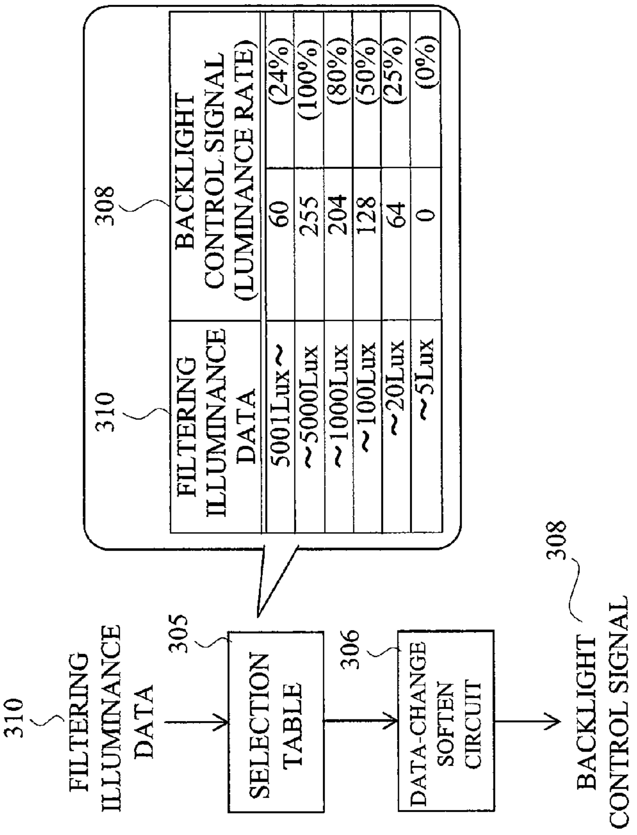
FIG. 3C is a diagram showing a configuration and operation of the second backlight control unit according to the first embodiment of the present invention.

Next, with reference to FIGS. 3A to 3C, the second backlight control unit 108 performing backlight control by the illuminance sensor described in FIG. 1 is described. The second backlight control unit 108 (FIG. 3A) is divided into two circuits, that is, a filter circuit 301 (FIG. 3B) and a darkening circuit 302 (FIG. 3C).

The filter circuit 301 filters an inputted illuminance value (digital data) and cuts a signal in a specific frequency region. For example, by cutting a signal in a frequency region of a fluorescent lamp, the circuit is used to prevent interference with the fluorescent lamp. The filter circuit 301 includes a data sampling circuit 303 and a low-pass filter circuit 304. The data sampling circuit 303 is a circuit for taking in illuminance data, and a timing of taking in the illuminance data is determined by a sampling clock 309. Here, a sampling period of the sampling clock 309 is preferably a frequency equal to or larger than a doubled frequency of the frequency region to be cut, in consideration of a maximum cut frequency (=Nyquist frequency). The low-pass filter circuit 304 cuts the specific high-frequency region as described above, reduces influences such as noise and interference with a light source and outputs filtering illuminance data 310.

Next, in the darkening circuit 302, a backlight control signal is selected according to the illuminance data, and change of the luminance of the backlight caused by the change of the backlight control signal is performed gradually using a sufficient transition time. The darkening circuit 302 includes a selection table 305 and a data-change soften circuit 306. The selection table 305 converts the filtering illuminance data to a backlight control signal value. For example, an illuminance-value region is divided into an indoor dark portion, an indoor bright portion, an outdoor dark portion and an outdoor bright portion, and when each illuminance-value region is changed, the backlight luminance is changed. The data-change soften circuit 306 is added with a circuit for slowing down a data change to change the backlight luminance using a sufficient time. Here, the sufficient time is a time in which the change is not rapid for human eyes, and the change is preferably performed in several hundreds milliseconds to several seconds. And, the changing time is desired to be constant even if an amount of change is varied.

Here, by using FIGS. 3A to 3C, relation between the illuminance sensor and backlight control is briefly described. For example, in a dark place, such as an indoor place with no light on, a display on the screen can be viewed even if the backlight is darkened. And therefore, a backlight luminance rate is reduced. If the illuminance value sensed by an external-light sensor is filtered by the filter circuit 301 and the filtering illuminance data 310 is constant at approximately 30 Lux, a backlight control signal 308 in the selection table 305 is 128 and 50% is selected as the backlight luminance rate.

Conversely, in a bright place, such as an outdoor place, the display is difficult to be viewed unless the backlight is brightened due to reflection on a surface of the screen and the like, and therefore, the backlight luminance rate has to be increased. If the filtering illuminance data 310 is constant at approximately 2000 Lux, the backlight control signal 308 in the selection table 305 is 255, and 100% is selected as the backlight luminance rate.

Here, in the present embodiment, it is assumed that the liquid-crystal panel is of a translucent type. In this case, when the external-light illuminance is higher to some extent, viewability of the display screen is improved due to reflection inside the liquid-crystal panel. And therefore, if the filtering illuminance data 310 is constant at a value equal to or higher than 5001 Lux, the backlight luminance rate is not required, and therefore, the back light control signal 308 in the selection table 305 is 60, and the backlight luminance rate is reduced to 24%.

And, in a case of a liquid-crystal panel of a transparent type, a display screen becomes increasingly difficult to be viewed as the external-light illuminance is increased. And therefore, usually, selection table setting such as reducing the luminance rate when the illuminance data is increased to some extent as in the translucent type is not performed.

Next, with reference to FIG. 4, the PWM generating unit 109 described with reference to FIG. 1 is described. In the PWM generating unit 109, the backlight control signals which are outputs from the above-described two backlight control units are synthesized and the PWM signal for controlling the backlight module is generated. The PWM generating unit 109 is divided into a circuit for synthesizing the backlight control signal composed of a switching circuit (1) 401, a switching circuit (2) 402, a multiplication processing unit 403 and a "X1/255" processing circuit 404, and a circuit for generating the PWM signal composed of a frequency-division counter 405, a 255 counter 406 and a PWM generating counter 407. The multiplication processing unit 403 is a logic circuit capable of multiplying inputted signals together.

A backlight control signal (1) 408 is inputted to the switching circuit (1) 401. And switching between the backlight control signal (1) 408 and a 255-fixed value is performed by a switching signal (1) 412. Here, the switching signal (1) 412 is also inputted to the first backlight control unit 107 for controlling an operation-ON/OFF state. Here, the 255-fixed value means selecting a luminance rate of 100%. Similarly, a backlight control signal (2) 409 is inputted to the switching circuit (2) 402 and switching between the backlight control signal (2) 402 and a 255-fixed value is performed by a switching signal (2) 413. And, an output of the second switching circuit 402 is subjected to a processing of division by 255 in the "×1/255" processing circuit 404 (×1/255 processing). As a result, a selection control signal from the switching circuit (2) is converted to a luminance rate of the backlight luminance with a maximum luminance defined as 255. Lastly, the multiplication processing unit 403 multiplies a selection control signal from the switching circuit (1) and the selection control signal from the switching circuit (2) together, and therefore, a backlight control signal with the backlight luminance by the selection control signal from the switching circuit (1) of the switching circuit (1) defined as 100% is generated. And, a synthesized backlight control signal 410 is inputted to the PWM generating counter 407.

Next, a method of generating the PWM signal is described. A basic clock 414 of an external input is inputted to the frequency-division counter 405 and an Enable signal 416 is generated. For example, if a division rate is four, 4 clocks of the basic clock are inputted and in a 1-clock period of the 4 clocks, the Enable signal is in a "High" state. Here, it is assumed that the division rate is set by a division ratio setting 415. The 255 counter 406 counts down a counter value only when the Enable signal 416 is in the “High” state, and after counting 255→254→ . . . →1→0, the counter is set to 255 again and the counting is continued. In this operation, when the counter value of the 255 counter 406 becomes 0, a reset signal 417 is set to a “High” state.

The PWM generating counter 407 sets a value of the synthesized backlight control signal 410 when the reset signal 417 is in a “High” state and the Enable signal 416 is in a “High” state. And, when the Enable signal 416 is in a “High” state, counting down from the value of the combined backlight control signal is performed and if the value becomes 0, the counter value is kept at 0. And, when the reset signal 417 transits to a “High” state again, the synthesized backlight control signal 410 is set as the counter value. Here, the PWM generating counter 407 can generate a PWM signal having a “High” width rate same as the value of the synthesized backlight control signal 410 by setting the PWM signal to a “High” state when the counter value is other than 0 and to a “Low” state when the counter value is 0.

Figure 5A:
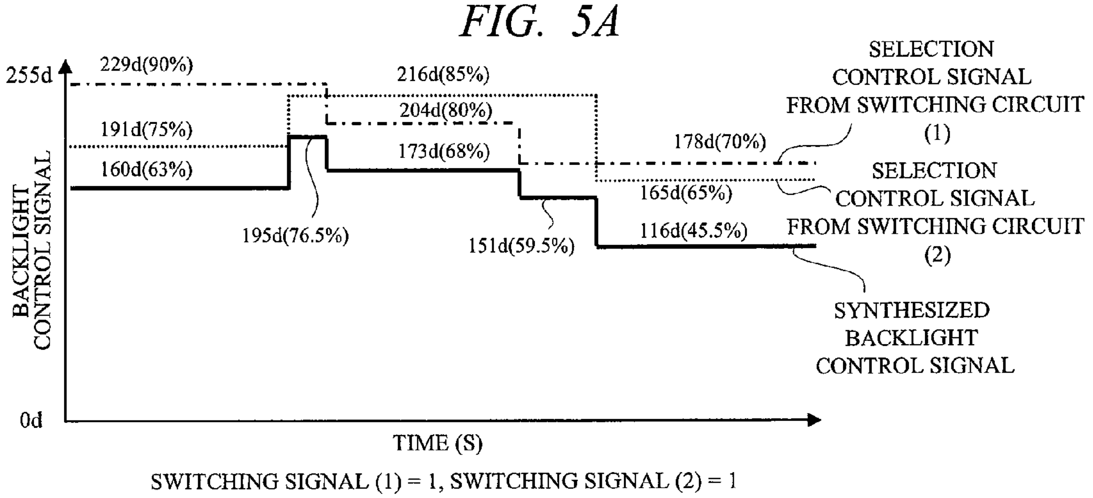
FIG. 5A is a drawing showing relation between a backlight control signal and selection control signals according to the first embodiment of the present invention.
Figure 5B:
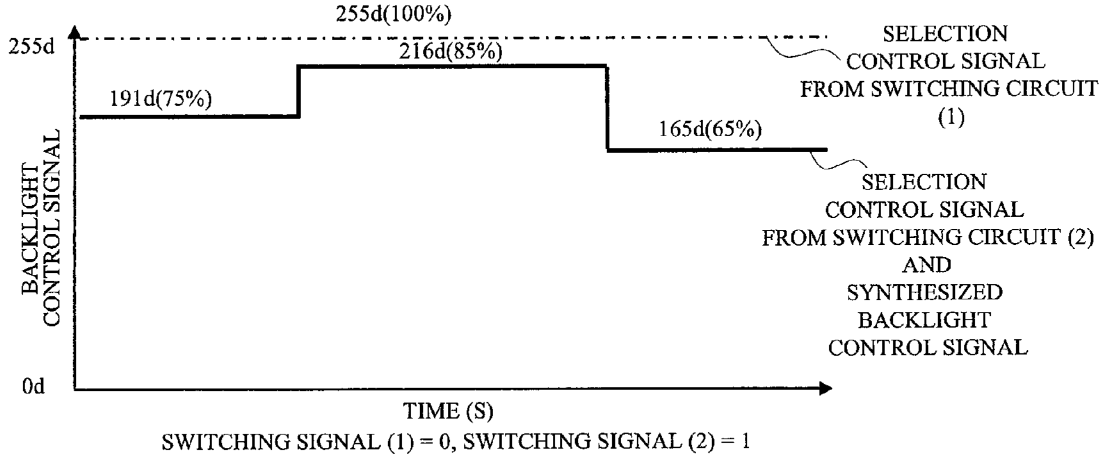
FIG. 5B is a drawing showing relation between the backlight control signal and the selection control signals according to the first embodiment of the present invention.
Figure 5C:
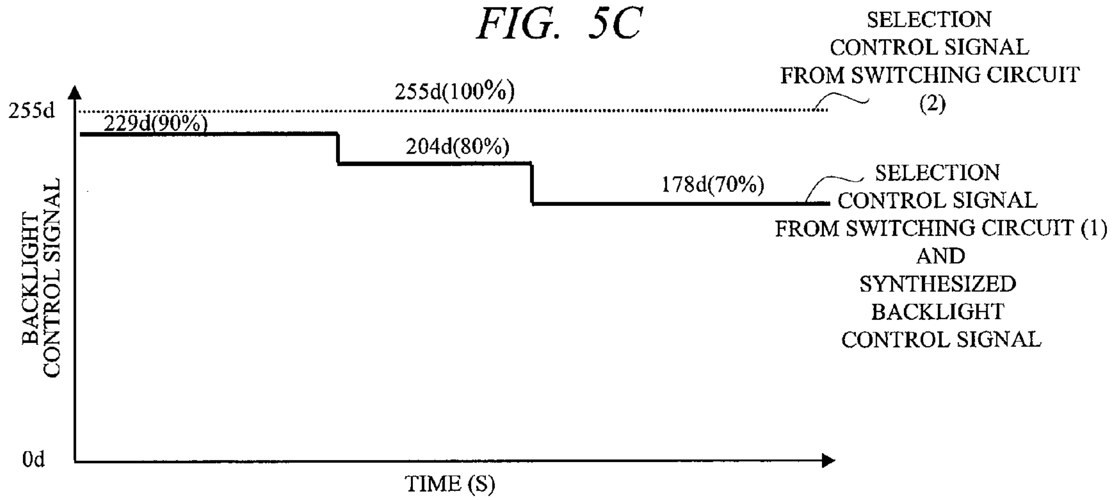
FIG. 5C is a drawing showing relation between the backlight control signal and the selection control signals according to the first embodiment of the present invention.

Next, with reference to FIGS. 5A, 5B and 5C, behavior of the backlight control signal when settings of the switching signal (1) and the switching signal (2) are changed is described. Here, in the second backlight control unit 108, a function of the data-change soften circuit 306 is omitted for ease of description.

In a case where the switching signal (1) and the switching signal (2) inputted from the control register 103 (FIG. 1) are such that the switching signal (1)=1 and the switching signal (2)=1, as for the selection control signal from the switching circuit (1), the backlight control signal after the processing of the first backlight control unit 107 (the backlight control signal (1) 408) is selected, and as for the selection control signal from the switching circuit (2), the backlight control signal after the processing of the second backlight control unit 108 (the backlight control signal (2) 409) is selected. For example, when the selection control signal from the switching circuit (1) is 229d and the selection control signal from the switching circuit (2) is 191d, the synthesized backlight control signal is 229d×191d/255d=160d.

In a case where the switching signal (1) and the switching signal (2) inputted from the control register 103 (FIG. 1) are such that the switching signal (1)=0 and the switching signal (2)=1, as for the selection control signal from the switching circuit (1), 255d is selected, and as for the selection control signal from the switching circuit (2), the backlight control signal after the processing of the second backlight control unit 108 (the backlight control signal (2) 409) is selected. For example, when the selection control signal from the switching circuit (2) is 191d, since the selection control signal from the switching circuit (1) is 229d, the synthesized backlight control signal is 229d×255d/255d=229d. That is, when 255d, which is a fixed value, is selected, control by the backlight control signal (1) is invalidated, and only control by the backlight control signal (2) is effective.

In a case where the switching signal (1) and the switching signal (2) inputted from the control register 103 (FIG. 1) are such that the switching signal (1)=1 and the switching signal (2)=0, as for the selection control signal from the switching circuit (1), the backlight control signal after the processing of the first backlight control unit 107 (the backlight control signal (1) 408) is selected, and as for the selection control signal from the switching circuit (2), 255d is selected. For example, when the selection control signal from the switching circuit (1) is 229d, since the selection control signal from the switching circuit (2) is 255d, the synthesized backlight control signal is 229d×255d/255d=229d. That is, when 255d, which is a fixed value, is selected, control by the backlight control signal (2) is invalidated, and only control by the backlight control signal (1) is effective.

According to the present embodiment described above, the histogram is provided not for all pixel values (0 to 255), but for values of an upper part (for example, 183 to 255). And, if pixels of top several percent in the histogram are within a range of presence of the histogram, operation is performed in a manner similar to a case in which the histogram is provided for all pixel values. If the pixels of top several percent exist outside of the range of presence of the histogram, a minimum value of the range of presence of the histogram is used in place of the pixels of top several percent and the operation is performed. And, in a case where the backlight control using the histogram is performed in combination with another backlight control (with an optical sensor and the like), a processing in which a backlight-control signal value after the histogram control is taken as 100% is performed. That is, when the backlight-control signal value after the histogram processing has a luminance rate of X % with respect to maximum luminance of the backlight, and another backlight-control signal value has a luminance rate of Y % with respect to the maximum luminance of the backlight, a synthesized backlight control signal has a luminance rate of X×Y % with respect to the maximum luminance of the backlight. And therefore, the histogram can be configured with only values of an upper part, and logic circuit size can be reduced to, for example, approximately 30% in a case of using a range of pixel values of 183 to 255. And, in actual video, an amount of reduction of light emission corresponds to a part of top 30% of the histogram, and if a detection circuit only for the part is provided, effects similar with that in a case of having a detection circuit for all values can be obtained. Still further, backlight control using the histogram processing described above can be used in combination with effect of other backlight control.

(Second Embodiment)

In a second embodiment according to the present invention, two backlight control units, that is, a first backlight control unit controlling the backlight based on video data of a liquid-crystal driver and a second backlight control unit controlling the backlight based on an external-light condition, are used in combination. And when a backlight control signal of the second backlight control unit is lower than a threshold set in a register, operation of the first backlight control unit is turned OFF. A luminance rate with respect to maximum backlight luminance set as the threshold is assumed to be Q %.

And, in the present embodiment, as described in the first embodiment, the first backlight control unit performs a backlight control using a histogram with small circuit size.

The second embodiment of the present invention is described by using FIGS. 1, 2, 3A to 3C, 6 and 7A to 7C. However, FIGS. 1 to 3C are described in the first embodiment, and therefore, are not described herein.

Figure 4:
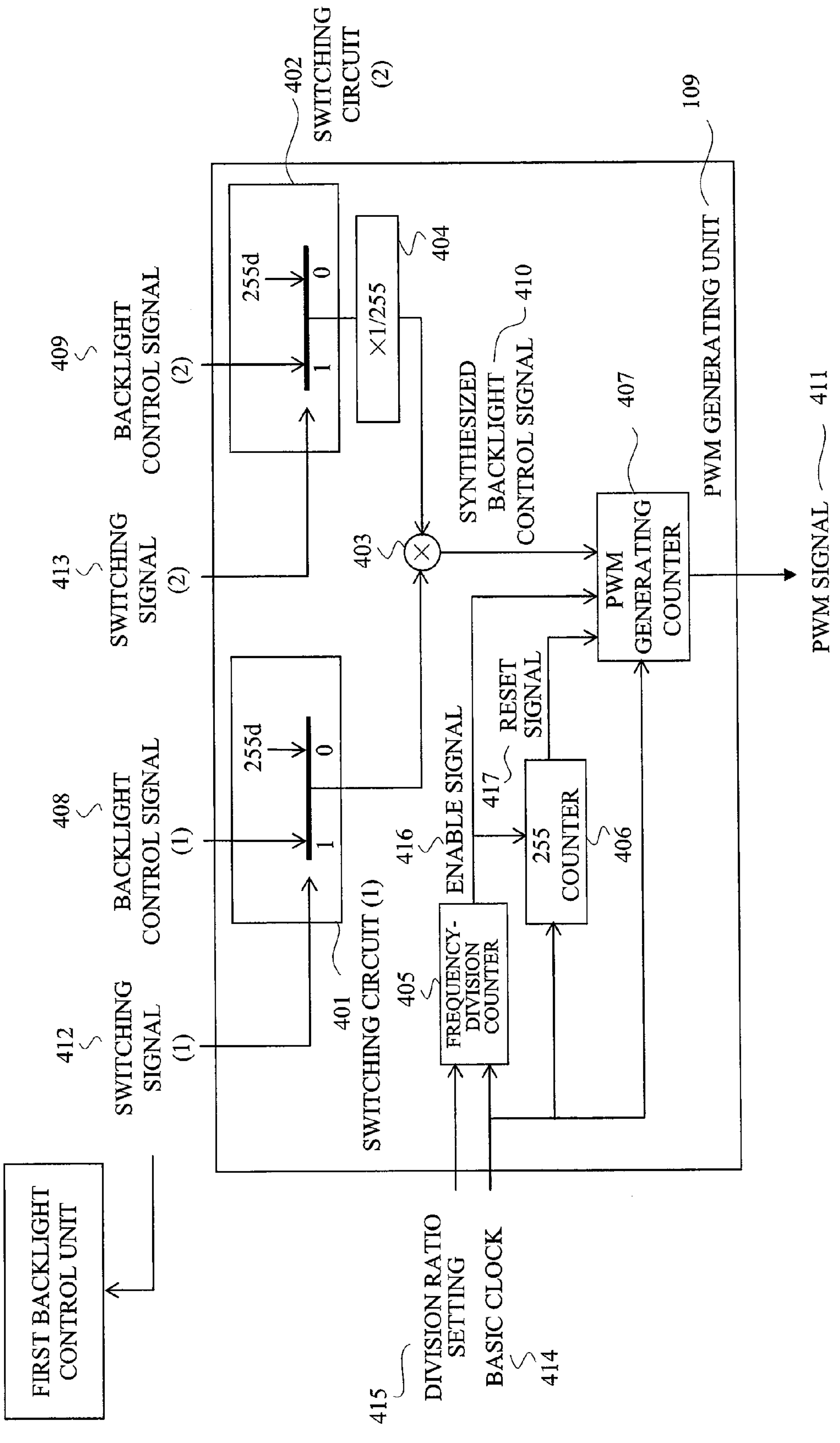
FIG. 4 is a diagram showing a configuration and operation of a PWM generating unit according to the first embodiment of the present invention.
Figure 6:
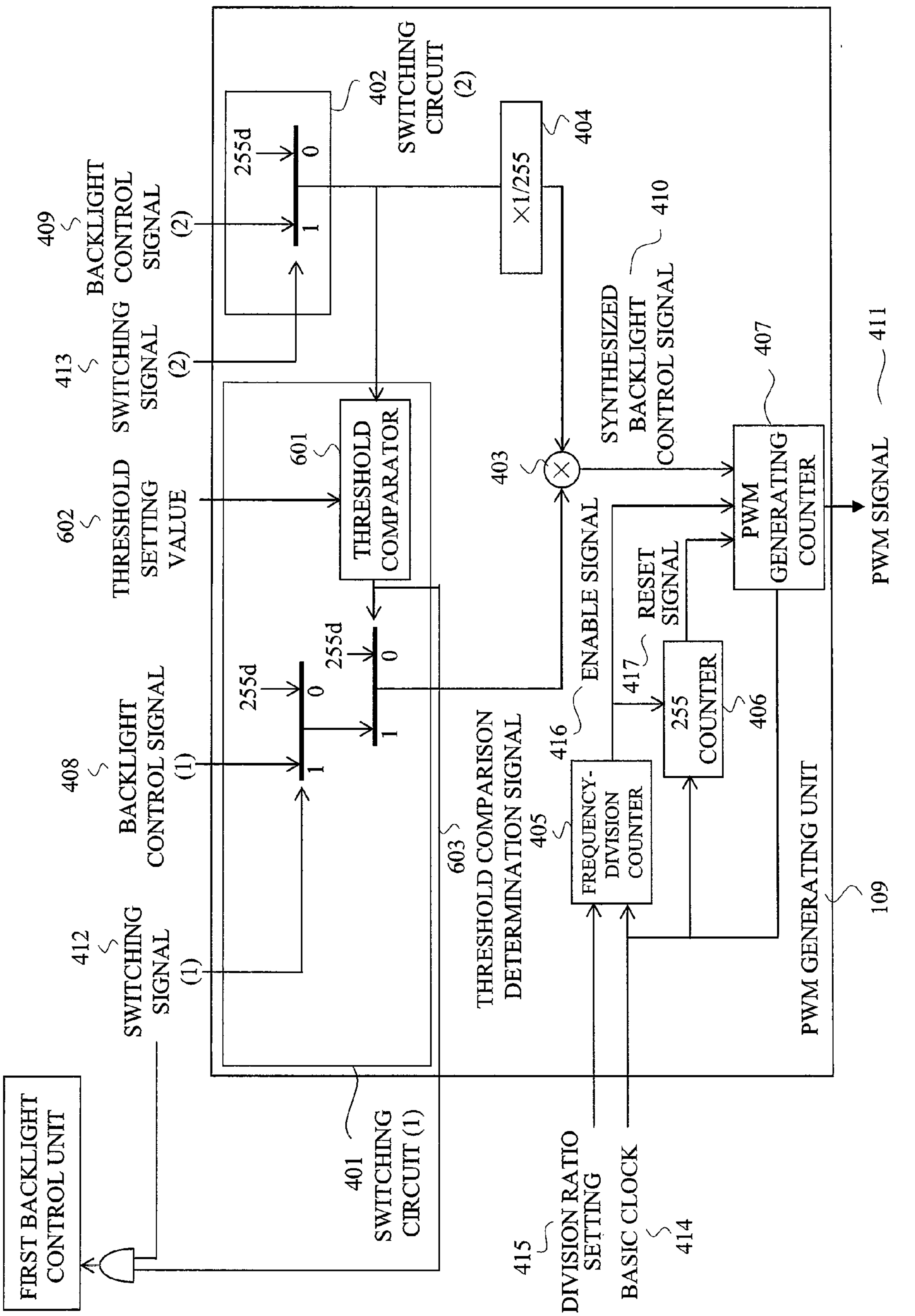
FIG. 6 is a diagram showing a configuration and operation of a PWM generating unit according to a second embodiment of the present invention.

FIG. 6 shows a configuration basically similar to the configuration of FIG. 4 in the first embodiment, however, a threshold comparator 601, a threshold setting value 602 and a threshold comparison determination signal 603 are newly added. Note that, components having the same names as those described with reference to FIG. 4 denote the same, and therefore, are not described herein.

At the threshold comparator 601, comparison between the backlight control signal (2) 409 processed in the second backlight control unit 108 and the threshold setting value 602 set in a resister is performed. If the backlight control signal (2) 409 is smaller than the threshold setting value 602, the threshold comparison determination signal 603 transits to a “Low” state. As a result, 255d is outputted as the selection control signal from the switching circuit (1) 401. The threshold comparison determination signal 603 and the switching signal (1) 412 are inputted to an AND circuit and an operation-ON/OFF state of the first backlight control unit 107 is set.

Figure 7A:
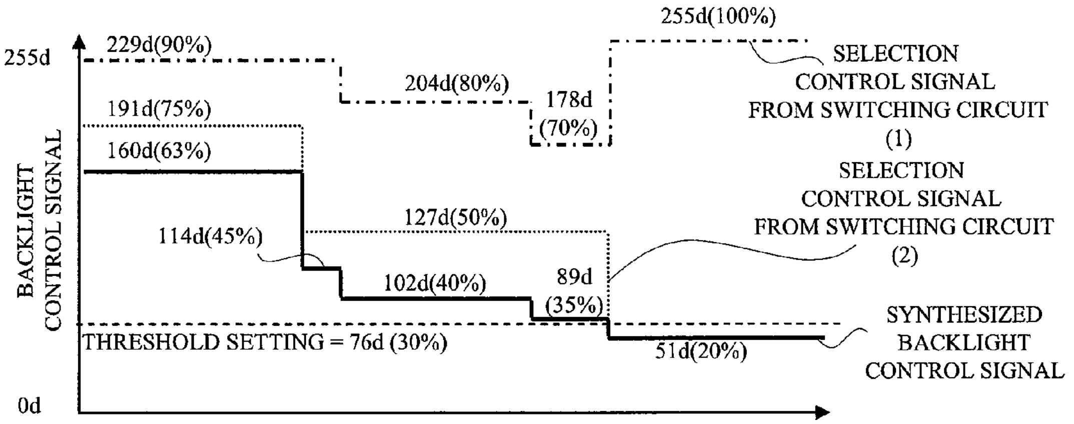
FIG. 7A is a drawing showing relation between a backlight control signal and selection control signals according to the second embodiment of the present invention.
Figure 7B:
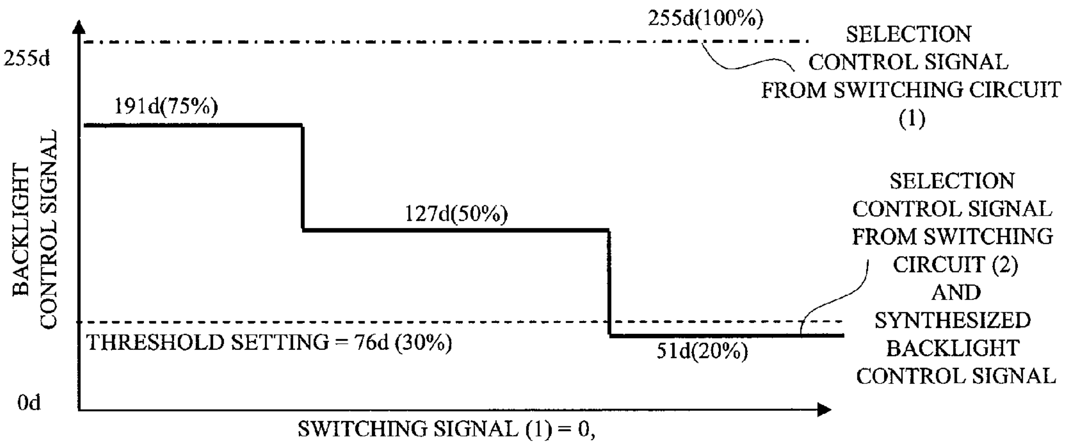
FIG. 7B is a drawing showing relation between the backlight control signal and the selection control signals according to the second embodiment of the present invention.
Figure 7C:
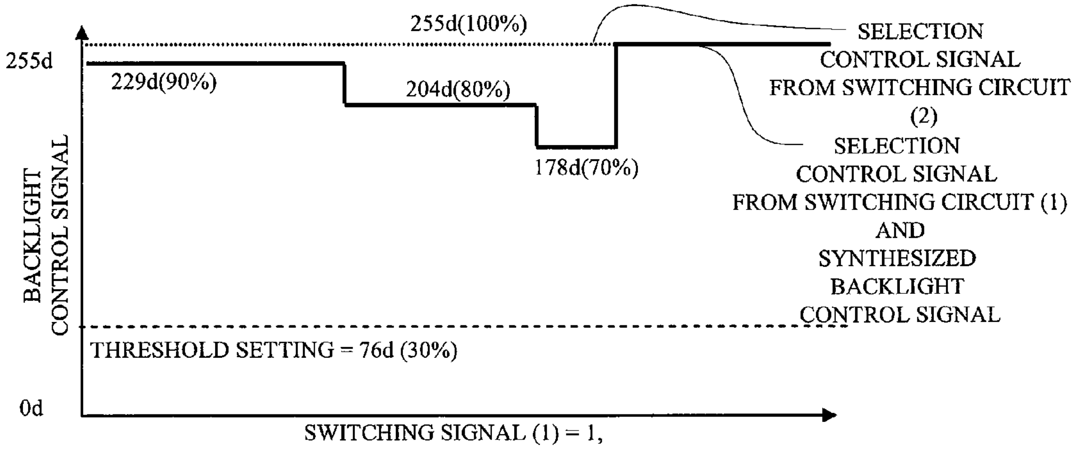
FIG. 7C is a drawing showing relation between the backlight control signal and the selection control signals according to the second embodiment of the present invention.

Next, with reference to FIGS. 7A, 7B and 7C, behavior of the backlight control signal when settings of the switching signal (1) and the switching signal (2) and the threshold setting value are changed is described. Here, in the second backlight control unit 108, a function of the data-change soften circuit 306 is omitted for ease of description.

Firstly, a case in which the switching signal (1)=1, the switching signal (2)=1 and the threshold setting value=76d (=76d/255≅30%) is considered. As for the selection control signal from the switching circuit (1), if the selection control signal from the switching circuit (2) is higher than the threshold setting value, the backlight control signal after the processing of the first backlight control unit 107 (the backlight control signal (1) 408) is selected. And, if the selection control signal from the switching circuit (2) is lower than the threshold setting value, 255d is selected. On the other hand, as for the selection control signal from the switching circuit (2), the backlight control signal after the processing of the second backlight control unit 108 (the backlight control signal (2) 409) is selected. For example, when the selection control signal from the switching circuit (1) is 229d and the selection control signal from the switching circuit (2) is 191d, the synthesized backlight control signal is 229d×191d/255d=160d. On the other hand, when the selection control signal from the switching circuit (2) is 51d, since the selection control signal from the switching circuit (2) is smaller than the threshold setting value, 255d is selected as the selection control signal from the switching circuit (1), and the synthesized backlight control signal is 255d×89d/255d=89d.

Next, a case in which the switching signal (1)=0, the switching signal (2)=1 and the threshold setting value=76d (=76d/255≅30%) is considered. As for the selection control signal from the switching circuit (1), 255d is selected irrespectively of the selection control signal from the switching circuit (2) and the threshold setting value. And, as for the selection control signal from the switching circuit (2), the backlight control signal after the processing of the second backlight control unit 108 (the backlight control signal (2) 409) is selected. For example, when the selection control signal from the switching circuit (2) is 191d, since the selection control signal from the switching circuit (1) is 255d, the synthesized backlight control signal is 255d×191d/255d=191d. On the other hand, when the selection control signal from the switching circuit (2) is 51d, since the selection control signal from the switching circuit (2) is smaller than the threshold setting value, 255d is selected as the selection control signal from the switching circuit (1), and the synthesized backlight control signal is 255d×89d/255d=89d.

Lastly, a case in which the switching signal (1)=1, the switching signal (2)=0, and the threshold setting value=76d (=76d/255d≅30%) is considered. Since the selection control signal from the switching circuit (2) is always 255d, relation in magnitude, that is, the selection control signal value from the switching circuit (2)>threshold setting value is kept. And therefore, the threshold comparison determination signal 603 is always in a "High" state. So, as for the selection control signal from the switching circuit (1), the backlight control signal after the processing of the first backlight control unit 107 (backlight control signal (1) 408) is selected. For example, when the selection control signal from the switching circuit (1) is 229d, since the selection control signal from the switching circuit (2) is 255d, the synthesized backlight control signal is 229d×255d/255d=229d. Note that, irrespectively of a value used as the backlight control signal (2) 409, since the selection control signal from the switching circuit (2) is always 255d, and therefore, the synthesized backlight control signal is not changed.

According to the present embodiment described above, in the same way as the first embodiment, the histogram can be configured with only values of an upper part, and logic circuit size can be reduced to, for example, approximately 30% in a case of using a range of pixel values of 183 to 255. And, in actual video, an amount of reduction of light emission corresponds to a part of top 30% of the histogram, and if a detection circuit only for the part is provided, effects similar with that in a case of having a detection circuit for all values can be obtained. Still further, backlight control using the histogram processing described above can be used in combination with effect of other backlight control.

In the foregoing, the invention made by the inventors of the present invention has been concretely described based on the embodiments. However, it is needless to say that the present invention is not limited to the foregoing embodiments and various modifications and alterations can be made within the scope of the present invention.

For example, in the above embodiments, the first backlight control unit controlling the backlight in conjunction with the data and the second backlight control unit controlling the backlight in conjunction with the optical sensor are assumed. However, the number of these backlight control units is not restricted to two. For example, in a case where a third backlight control unit operating in conjunction with a third optical sensor is configured in addition to the above-described two backlight control units, the second and the third optical sensors may be used with switching each other.

The display driver according to the present invention can implement a method of controlling the backlight and reducing power consumption thereof with a suppressed logical amount, and can be applied not only to a liquid-crystal display for a cellular phone but also to a small-sized media player such as a DVD player using a liquid-crystal display.

What is claimed is:

1. A display driver comprising:

a first backlight control unit including a circuit for switching brightness of a display image based on a display data value at a predetermined position of a histogram of inputted display data and a circuit for switching backlight luminance based on the display data value, an object of detection of the histogram being a data range from a brightest level to an N-th level of gray-scale (N is a positive integer and is not 0) of the display data;

a second backlight control unit including a circuit for backlight luminance control different from the first backlight control unit; and a generating unit setting a backlight control signal value consisting of a product of a luminance rate of X % and a luminance rate of Y % as a luminance rate of a backlight control signal for controlling a backlight with respect to maximum backlight luminance where a luminance rate of the backlight control signal obtained by a processing of the first backlight control unit with respect to the maximum backlight luminance is defined as X % (0<X<100) and a luminance rate of the backlight control signal obtained by a processing of the second backlight control unit with respect to the maximum backlight luminance is defined as Y % (0<Y<100), wherein the circuit for backlight luminance control of the second backlight control unit senses external-light luminance with an optical sensor and adjusts the backlight luminance, and wherein the luminance rate of Y % is defined based on the external-light luminance.

2. The display driver according to claim 1, wherein when stopping the processing of the first backlight control unit, an operation of setting the luminance rate of X % of the backlight control signal obtained by the processing of the first backlight control unit to 100% is performed, or an operation of selecting 100% as the luminance rate of the backlight control signal in place of X % obtained by the processing of the first backlight control unit and setting the luminance rate for controlling the backlight to the luminance rate of Y % obtained by the processing of the second backlight control unit is performed.

3. The display driver according to claim 1, wherein when stopping the processing of the first backlight control unit, the first backlight control unit is stopped by register setting from outside, and the luminance rate for controlling the backlight is set to the luminance rate of Y % obtained by the processing of the second backlight control unit.

4. The display driver according to claim 1, wherein when stopping the processing of the second backlight control unit, an operation of setting the luminance rate of Y % of the backlight control signal obtained by the processing of the second backlight control unit to 100% is performed, or an operation of selecting 100% as the luminance rate of the backlight control signal in place of Y % obtained by the processing of the second backlight control unit and setting the luminance rate for controlling the backlight to the luminance rate of X % obtained by the processing of the first backlight control unit is performed.

5. The display driver according to claim 1, wherein when stopping the processing of the second backlight control unit, the second backlight control unit is stopped by register setting from outside, and the luminance rate for controlling the backlight is set to the luminance rate of X % obtained by the processing of the first backlight control unit.

6. The display driver according to claim 1, wherein the backlight control signal for controlling the backlight is outputted as a PWM signal of one bit.

7. A display driver comprising:

a first backlight control unit including a circuit for switching brightness of a display image based on a display data value at a predetermined position of a histogram of inputted display data and a circuit for switching backlight luminance based on the display data value, an object of detection of the histogram being a data range from a brightest level to an N-th level of gray-scale (N is a positive integer and is not 0) of the display data;

a second backlight control unit including a circuit for backlight luminance control different from the first backlight control unit; and a generating unit, when a luminance rate of a backlight control signal obtained by a processing of the second backlight control with respect to the backlight maximum luminance is Y % and the luminance rate of Y % is smaller than a luminance rate of Q % with respect to the backlight maximum luminance set as a threshold, the generating unit stopping a processing of the first backlight control unit and setting a backlight control signal value of a luminance rate of Y % as a luminance rate of a backlight control signal for controlling a backlight with respect to backlight maximum luminance, wherein the circuit for backlight luminance control of the second backlight control unit senses external-light luminance with an optical sensor and adjusts the backlight luminance, and wherein the luminance rate of Y % is defined based on the external-light luminance.

8. The display driver according to claim 7, wherein the threshold can be set from outside.

9. The display driver according to claim 7, wherein when stopping the processing of the first backlight control unit without using the threshold, the first backlight control unit is stopped by register setting from outside, and the luminance rate of Y % obtained by the processing of the second backlight control unit is set as the luminance rate for controlling the backlight.

10. The display driver according to claim 7, wherein when stopping the processing of the second backlight control unit, an operation of setting the luminance rate of Y % of the backlight control signal obtained by the processing of the second backlight control unit to 100% is performed, or an operation of selecting 100% as the luminance rate of the backlight control signal in place of Y % obtained by the processing of the second backlight control unit and setting the luminance rate for controlling the backlight to a luminance rate of X % obtained by the processing of the first backlight control unit is performed.

11. The display driver according to claim 7, wherein when stopping the processing of the second backlight control unit, the second backlight control unit is stopped by register setting from outside, and a luminance rate of X % obtained by the processing of the first backlight control unit is set as the luminance rate for controlling the backlight.

12. The display driver according to claim 7, wherein the backlight control signal for controlling the backlight is outputted as a PWM signal of one bit.

13. A display driver for use with an optical sensor for sensing external-light luminance and a display panel with a backlight the display driver comprising:

an interface coupled to receive display data;

a memory which stores the display data;

a circuit which provides to the display panel gray scale voltages based on the display data received from the memory;

a first backlight control unit for backlight luminance control based on the display data received from the memory, the first backlight control unit providing a first backlight control signal representing a first luminance rate (X %) of the backlight;

a second backlight control unit for backlight luminance control based on an output signal from the optical sensor, the second backlight control unit providing a second backlight control signal representing a second luminance rate (Y %) of the backlight; and a PWM (Pulse Width Modulation) signal generation circuit which is coupled to receive the first backlight control signal and the second backlight control signal and which provides to the backlight a PWM control signal based on the first backlight control signal and the second backlight control signal, and wherein the luminance rate of Y % is defined based on the external-light luminance.

14. A display driver according to claim 13, wherein the PWM control signal has, in one PWM period, a first level width (a high width) and a second level width (a low level width), and wherein the PWM generation circuit is pulse-width fluctuation control controlling the backlight luminance by changing a rate between the first level width and a second level width of the PWM control signal.

* * * * *